United States Patent
Field et al.

(10) Patent No.: US 8,407,102 B2
(45) Date of Patent: Mar. 26, 2013

(54) PRINTING VIA E-COMMERCE METHOD AND SYSTEM

(75) Inventors: Andrew Scott Field, Emigrant, MT (US); Boyd Stanley Badten, Livingston, MT (US)

(73) Assignee: Printingforless.com, Livingston, MT (US)

( * ) Notice: Subject to any disclaimer, the term of this patent is extended or adjusted under 35 U.S.C. 154(b) by 341 days.

(21) Appl. No.: 12/112,491

(22) Filed: Apr. 30, 2008

(65) Prior Publication Data

US 2008/0201236 A1 Aug. 21, 2008

Related U.S. Application Data

(62) Division of application No. 09/518,060, filed on Mar. 2, 2000, now abandoned.

(60) Provisional application No. 60/123,328, filed on Mar. 8, 1999.

(51) Int. Cl.
*G06Q 30/00* (2006.01)

(52) U.S. Cl. ............... 705/26.5; 705/26.8; 705/27.1

(58) Field of Classification Search ............. 705/26–27
See application file for complete search history.

(56) References Cited

U.S. PATENT DOCUMENTS

| | | | |
|---|---|---|---|
| 4,839,829 A | 6/1989 | Freedman | |
| 4,908,301 A | 3/1990 | Grosso et al. | |
| 5,241,464 A * | 8/1993 | Greulich et al. | 705/26 |
| 5,287,194 A | 2/1994 | Lobiondo | |
| 5,826,244 A | 10/1998 | Huberman | |
| 6,009,192 A * | 12/1999 | Klassen et al. | 382/167 |
| 6,012,070 A | 1/2000 | Cheng et al. | |
| 6,076,080 A | 6/2000 | Morscheck et al. | |
| 6,102,406 A | 8/2000 | Miles et al. | |
| 6,134,568 A | 10/2000 | Tonkin | |
| 6,247,011 B1 | 6/2001 | Jecha et al. | |
| 6,330,542 B1 | 12/2001 | Sevcik et al. | |
| 6,535,294 B1 * | 3/2003 | Arledge et al. | 358/1.15 |
| 6,631,375 B2 | 10/2003 | Jecha et al. | |
| 6,728,947 B1 * | 4/2004 | Bengston | 717/103 |
| 7,120,634 B2 | 10/2006 | Jecha et al. | |

OTHER PUBLICATIONS

Seybold: "How printers are exploiting the web," Seybold Report, Jan. 1, 1999; Dialog file 275 #02260449, 2pgs.*
Imapro: "IFRA 1991: helping to define a new playing field," Urban Joner et al., Seybold Report on Publishing Systtems, Nov. 20, 1991, v21n6p3; Dialog file 275 #01461467 65pgs.*
Lantana Crackerjack: Internet Archive Wayback Machine, www.archive.org; www.lantanarips.com; 1998; 26pgs.*
Edwards et al. "Roll Over Gutenberg" How the Web is changing Printing, Seybold Report on Internet Publishing, Sep. 1997, v2n1p5(16), Dialog file 275 #02110082.
Eliezer, "Robert's Web: Printer Cust Turnaround Time With Web (A&a Printers and Digital Graphics Offers Printing Service Via the Company's Web Page)," Seybold Report on Desktop Publishing, Dec. 11, 1995, v10n4p20(6), Dialog file 275.
OIC: Pack, "Interactive Web Sites Help Calculate Your Life," Austin American Statesman, Feb. 10, 1996, Proquest.

(Continued)

*Primary Examiner* — Robert M. Pond
(74) *Attorney, Agent, or Firm* — Winthrop & Weinstine, P.A.

(57) ABSTRACT

A method and system used to obtain and process orders for full color printing. A job configuration and price calculator is supplied to a customer. The calculator calculates automatically a price quote as the customer selects configuration options of a print job. The price quote is then displayed automatically. The customer may select configuration options repeatedly until the job configuration is final. A digital graphic layout or image file is then obtained from the customer. The digital graphic layout or image file is then prepared and a proof thereof is created. When the proof is satisfactory, the print job is printed and delivered to the customer.

18 Claims, 12 Drawing Sheets

OTHER PUBLICATIONS

OIC: Spittles, "The Best Site for Your New House is . . . www.co.uk Homebuyers Are Online to Hassle-free Purchasing As Lenders Wake Up to the Advertising Potential of the Internet," The Observer, Dec. 21, 1997, p11, ISSN #00297712, Proquest.

OIC: Morton, "The Competitive Arsenal in the Small Shipment Wars," Transportation & Distribution, Mar. 1996, v37n3p65, ISSN #08958548, Proquest.

OIC: Weber, "Watching the Web," Wall Street Journal, Jan. 22, 1998, p. B5, IISN #00999660, Proquest.

Printing Impressions, "Section 3: Prepress Electronic Imaging," Jul. 1998, v41n2p148(1), Dialog file 16 #06057253.

Real Time: Wilson, Doug' "Going Gateway One Better," Reseller Management, Feb. 1998, v21n2pg64, Proquest #26336348, 6pgs.

Real Time: "InforSpace Launches Free, Real-Time Quotes and Other Investment Services to Consumers," PR Newswire, Feb. 17, 1998, Proquest #26408924, 2pgs.

Real Time: Way, Paul "Progressive Sells, Binds Auto Insurance on 'Net," Insurance and Technology, Oct. 1997, v22n10pg Proquest #22387774, 3pgs.

Rohan, Rebecca; "Will a Website replace your neighborhood print shop?" Black Enterprise, Oct. 2001;32,3,59 ISSN: 0006-4165.

UPS: Thurmond, Jeffrey; "Shipping Into the Next Century," The National Public Accountant, Jun. 1996, v41n6pg13, 2 pgs, Proquest #9667408.

UPS: www.ups.com; Internet Archive Wayback Machine, www.archive.org/web/19970605xxxxxx/http://www.ups.com/; 1997,14 pages.

Veeramani et al.; "Methodologies for Rapid and Effective Response to Request for Quotation (RFQs)." IIE Transactions, Oct. 1997 v29n10pg825, Proquest #23351982 16pgs.

* cited by examiner

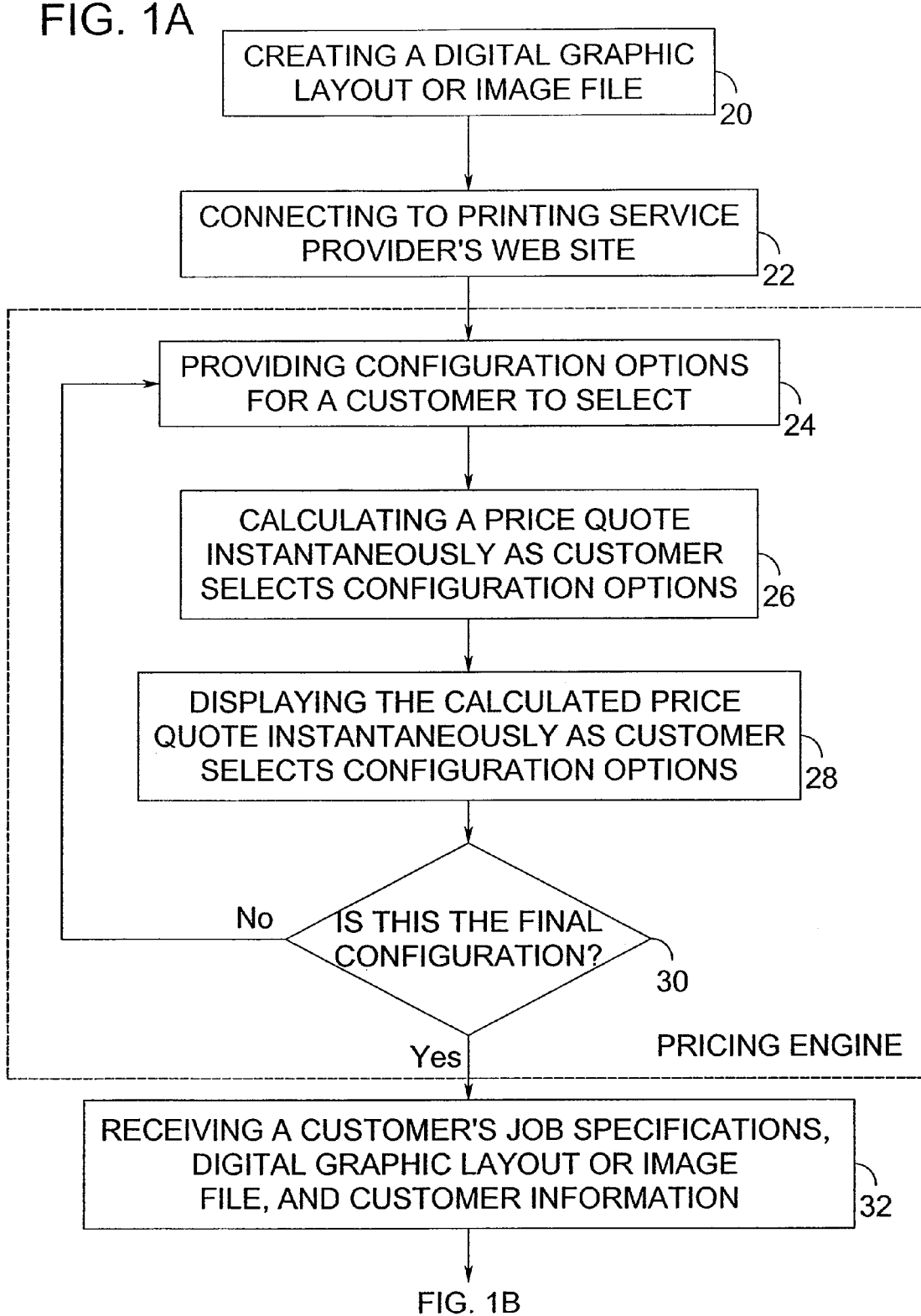

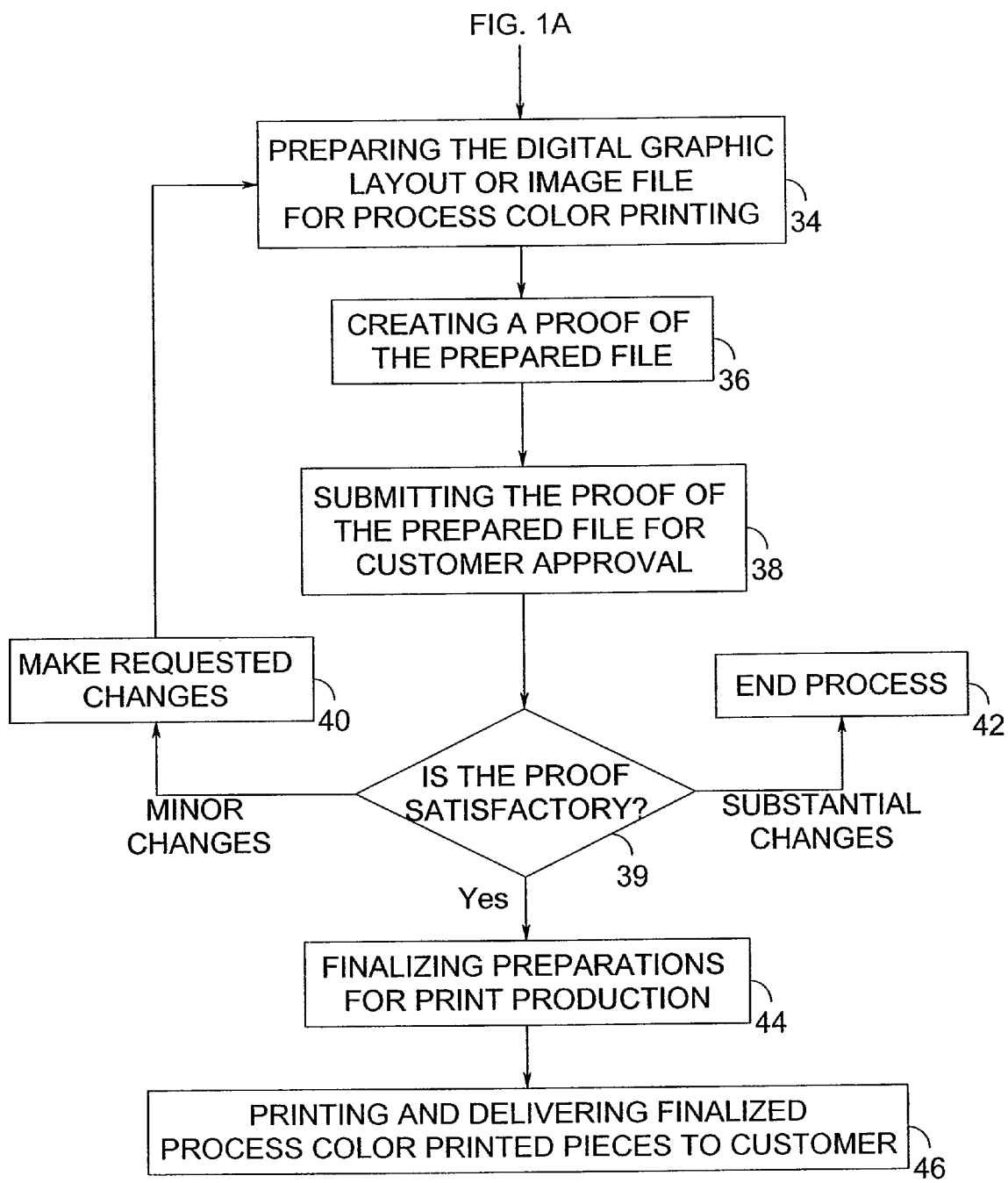

| Home | Brochures | Cards | Newsletters | Stationery | Catalogs | Custom Pieces |

Introduction | 8-1/2 x 11 | 8-1/2 x 14 | 11 x 17 | Posters | Samples

8-1/2 x 11 Brochures
Pricing and Ordering

How to Place Your Order
Step 1 Get a price by selecting your job format and quantity
Step 2 Select the proof format you want
Step 3 Select the document file to upload from your computer
Step 4 Complete the payment and shipping info

InstaPrice™

Enter Quantity: 250
(no commas)

[Calculate Price]

| | |
|---|---|
| Base Printing Price | $ 0.00 |
| Paper Upgrade | $ 0.00 |
| Aqueous Coating | $ 0.00 |
| Folding | $ 0.00 |
| Printing Subtotal | $ 0.00 |
| Cost Each | $ 0.00 |
| Shipping | $ 0.00 |
| Rush Handling | $ 0.00 |
| Order Total | $ 0.00 |

Javascript and CGI Copyright © 1998-1999
Express Color Printing, All Rights Reserved Front
○ 4-Color Back
● 4-Color
○ Black Only
○ Blank ○ Aqueous coating on printed side(s)   ● No Coating
(High-gloss scuff resistant coating)

Paper
● 80# gloss text weight
○ 80# matte text weight
○ 100# gloss text weight
○ 80# gloss cover stock

Folding
● No Fold
○ Half Fold
○ Tri Fold
○ Z Fold

No Fold

What Kind of Proof do you Prefer?

Adobe Acrobat PDF          JPEG Via Web Page
        ●                           ○

Select Your File Transfer Method

FIG. 9a

⊙ Select the File(s) to Upload from Your Computer

[                    ] Browse...
[                    ] Browse...
[                    ] Browse...
[                    ] Browse...

○ I would rather send my file on a Zip disk.
PrintingForLess.com
211 E. Geyser St.
Livingston, MT 59047
Mailing Details ○ Reprint of Previous Order # [        ]
$50 Discount -- subtracted from Order Total.
(Correct total will be shown on your receipt.)

Shipping and Billing Info
This information will not be shared with any third party.

[                    ] Account # *(if you have one)*
[                    ] Name
[                    ] Street Address
[        ] City [    ] State [    ] Zip Code ○  Visa   ○ Mastercard   ○ American Express
[                    ] Credit Card Number
[            ] Expires Special instructions or comments about your order.
[                              ]

Submit your order!

The Info is all correct... [Send Order]

FIG. 9b

8-1/2 x 11 Catalogs
Pricing and Ordering

How to Place Your Order
Step 1   Get a price by selecting your job format and quantity
Step 2   Select the proof format you want
Step 3   Select the document file to upload from your computer
Step 4   Complete the payment and shipping info Number of Pages   4 ⦿   8 ◯   12 ◯   16 ◯   20 ◯   24 ◯   28 ◯   32 ◯

Front and Back Covers     Inside Front & Back Covers

⦿ 4-Color                     ⦿ 4-Color
                                   ◯ Black ◯ Varnish on Front and Back Covers    ⦿ No Coating
(High-gloss scuff resistant coating)

Cover Paper
⦿ 80# gloss text weight    ◯ 100# gloss text weight
◯ 80# matte text weight    ◯ 80# gloss cover weight

Inside Pages

⦿ 4-Color         ⦿ 80# gloss text weight
◯ Black            ◯ 80# matte text weight
                         ◯ 100# gloss text weight

How Fast Would You Like Your Order?
⦿ Normal Handling. We ship on the 10th business day after proof approval, via UPS ground.
◯ Rush. We ship on the 5th business day after proof approval, via UPS 2nd Day Air. (Adds 80%)
(These timelines are for Quantities up to 10,000)

FIG. 10

PrintingForLess.com Order #10424046

Order Must Ship By _____   Ship   Normal

| Company Name In Theory Web Productions |
|---|
| Contact Name Joel Wesseldyke |
| Address 42 Kipp Ave. |
| City Hasbrouck Heights |
| State NJ |
| Zip Code 07601 |
| Phone # 201-945-1413 |
| Email Address joel@intheorywebproductions.com |
| Name on Credit Card Jeannette Visco |
| Billing Address |
| Billing City |
| Billing State |
| Billing Zip Code |

| Printing 186.00  Cost/Unit 0.37 |         |    |      |
|---|---|---|---|
| Shipping Cost 8.50 | | | |
| Reprint Discount 0.00 | | | |
| Coupon 0.00 | | | |
| Rush Charge 0.00 | | | |
| Total Cost 194.50 | | | |
| Credit Card Type MASTERCARD | | | |
| Credit Card # XXXXXXXXXXXXXXXX | | | |
| Expiration Date 12/01 | | | |
| Proof Charge | $39 | By | Date |
| Reg. Print Charge | | By | Date |
| Rush Charge | | By | Date |
| Check# | | By | Date |

|    | Quantity | Format | Fold Type | Folded Size | Bleed | Project Name | Colors/side |
|---|---|---|---|---|---|---|---|
| A. | 500 | Business Cards<br>1 boxes (500) Joel Wesseldyke | | — | — | New Cards | |
| B. | — | — | — | — | — | — | — |
| C. | — | — | — | — | — | — | — |

| Digital Files Arrived Via | Type of Proof Requested | Proof Approved/Date | Digital Technician | Scans Needed | Other Services |
|---|---|---|---|---|---|
| upload | Pdf | — | DW  CB  JL  BB | — | — |

| Reprint From Previous Order# | | With Changes | | Quantity | 500 |
|---|---|---|---|---|---|

| Press Sheet Size | Type of Stock | Parent Sheet Size | Number Out | Parent Sheets Needed | Cut By |
|---|---|---|---|---|---|
| — | | — | | — | — |
| — | — | — | — | — | — |
| — | — | — | — | — | — |

| Press | INK | SCORE | PERF | PMS | AQUEOUS | | Custom Mix | |
|---|---|---|---|---|---|---|---|---|
| A1 | 4-Color | | | | Aqueous Coating | | | |
| A2 | 4-Color | | | | | | | |

| Description | Press | Start With | Finish | Up | Out | SW | PF | WT | Turn | 1-S | Count-1/op | Count-2/op |
|---|---|---|---|---|---|---|---|---|---|---|---|---|
| | | | | | | | | | | | | |
| | | | | | | | | | | | | |
| | | | | | | | | | | | | |

| Shipping Method | Customer Must Have By: | Customer Instructions/Comments |
|---|---|---|

FIG. 14

PRINTING VIA E-COMMERCE METHOD AND SYSTEM

CROSS-REFERENCE TO RELATED APPLICATIONS

This application is a divisional application of and claims priority to U.S. application Ser. No. 09/518,060, filed Mar. 2, 2000, which is a non-provisional of U.S. Application Ser. No. 60/123,328, filed Mar. 8, 1999, the contents of which are incorporated in their entirety by reference.

BACKGROUND OF THE INVENTION

A system for marketing, selling, and executing full color printing services using customer created digital graphic layout or image files, and particularly a system for use in electronic communications in which the customer can instantaneously receive a price quote.

Full color printing has been the traditional means for producing high quality color printing. In its most common form, this is a light-subtractive process in which a separate plate or mask is created for four colors: cyan, magenta, yellow, and black. Thus, full color printing is also known as four-color printing or CMYK. The four colors are then used to produce full color printing. Other known full color printing systems include, but are not limited to, six-color printing, eight-color printing, and spot color printing. Typically full color printing recreates a desired image on paper using a printing press.

Many common graphic computer applications used by nonprofessionals, including but not limited to MICROSOFT WORD™ and MICROSOFT PUBLISHED™, are RGB-only graphic computer applications. RGB is a light-additive process in which red, green, and blue light is added to a palate to produce complex colors. Most RGB-only graphic computer applications do not allow images to be saved in a format that is compatible with full color printing. In fact, by definition, RGB-only graphic computer applications do not produce full color printing because they do not have an RGB to full color printing-separation module in their print engines. Most RGB-only graphic computer applications actually state explicitly that they are unable to provide files suitable for commercial full color printing. In order to have an RGB image produced on a full color printing system, the RGB image must generally be recreated on a full color printing-compatible system. This recreation generally entails additional expense and delay in producing the printed copies.

Further, even for computer software applications that do allow output to a file that is compatible with full color printing, not all process color printers are equipped to handle all types of electronic images. Accordingly, a person in a particular location may still be faced with having the image manually redrawn or otherwise converted into a format that is compatible with a particular printer's full color printing system.

The majority of printing service providers who will accept full color printing orders that are in RGB-only format are confined to primitive conversion techniques. And the vast majority of commercial print providers simply refuse to offer any services for those types of files because the conversion process cannot be done easily or economically for entire pages of complex design work such as one would get from a page layout program. The vast majority of programs on the market do not have a full color printing-separation module, and until recently, printing from these RGB programs using full color printing was either very difficult or impossible. When it was possible it entailed a variety of rather clumsy transitional stages using very expensive computer programs and techniques. And the results were often wanting in quality.

Printing services advertised over the Internet generally require that a customer submit specifications for the desired product and services using e-mail or the telephone. After the printing service provider receives the data and calculates a price quote, the printing service provider returns the price quote to the customer. This process involves delays of hours or days. Further, if the customer wants to make changes to their specifications, the lengthy process begins again. Alternatively, printing service providers post complicated pricing lists for specific products and services. These lists are limited in scope and require the customer to complete complicated computations.

Accordingly, there exists a need for a printing service that can produce full color printed materials using input from RGB-only graphic computer applications and other software applications that do not have an inherent ability to produce output in full color printing formats. Further, there exists a need for offering such services in a way that allows customers in any location to make use of them in an efficient and cost-effective manner. Finally, there exists a need for allowing customers to quickly, accurately, and repetitively determine a price quote for desired products and services.

BRIEF SUMMARY OF THE INVENTION

The present invention addresses the above problems by providing a system for electronically transmitting images in formats, including but not limited to those produced by RGB-only graphic computer applications, to a remote location where such images are processed and used in full color printing without the delay or expense of having the images recreated. The system also allows customers to quickly, accurately, and repetitively determine a price quote for desired products and services.

One preferred embodiment of the method of obtaining and processing orders for full color printing of the present invention includes supplying a customer with a job configuration and price calculator (pricing engine) in which the customer is able to select or fill in job configuration information. Substantially instantaneously and automatically, the pricing engine calculates and automatically displays a price quote. When the customer has determined a final configuration, the customer provides the job specifications, the digital graphic layout or image file, and its relevant information to the printing service provider. Preferably, the file is then converted and/or prepared for process color printing, proofed, printed, and delivered to the customer.

The simplicity of the system of the present invention allows for lower overhead than other currently available systems. Specifically, in one preferred embodiment of the system, major costly elements of the traditional process, including but not limited to price estimators, sales agents, hard copy proofs, press checks, and accounts-receivable bookkeeping expenses, have been eliminated. The cost savings can be passed to the customer.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIGS. 1A-1B are a flow chart of an exemplary embodiment of the system for transacting a printing job of the present invention.

FIGS. 8-10 are alternate exemplary embodiments of customer printing-option order interfaces.

FIG. 14 is an exemplary embodiment of dynamically-generated HTML job ticket.

DETAILED DESCRIPTION OF THE INVENTION

Figure 2:
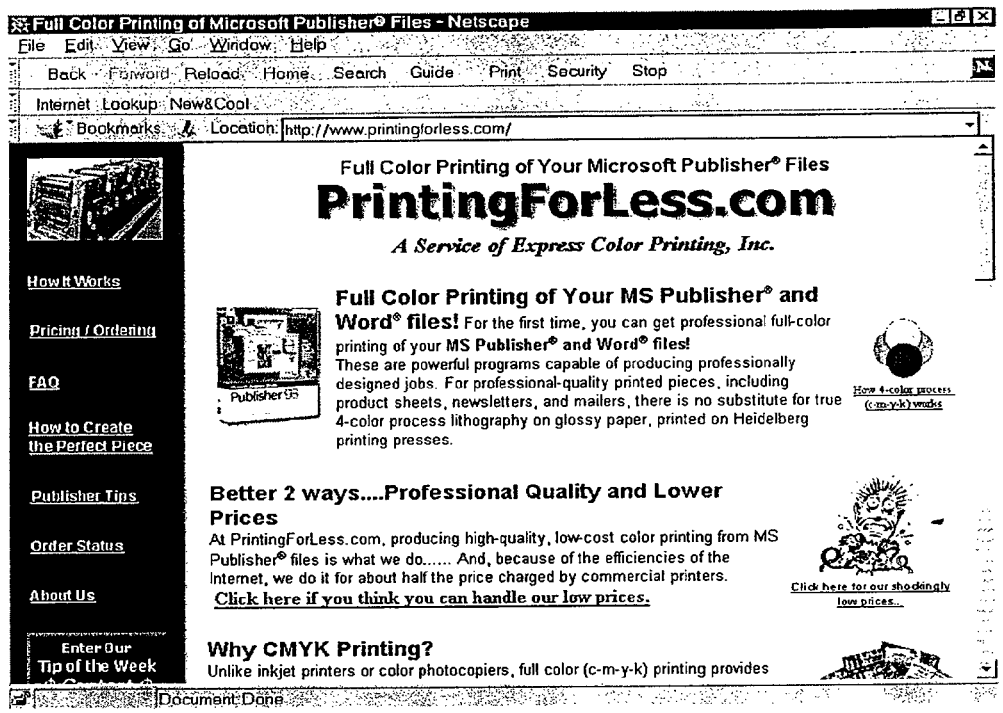
FIGS. 2-7 are exemplary embodiments of customer printing-option order interfaces.
Figure 3:
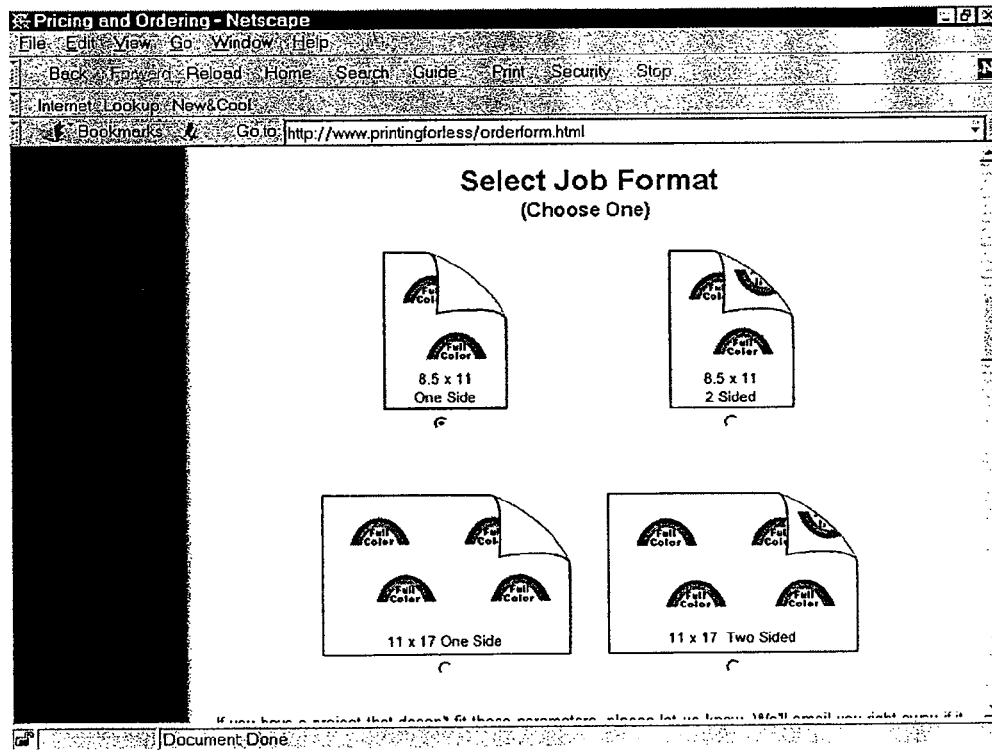

The present invention is directed to a method and apparatus for producing full color printed pieces using a commercial offset lithographic printing press, digital press, or digital printer from images created using graphic computer programs that create RGB color space or other nonstandard format electronic images. One preferred embodiment includes a pricing calculator or pricing engine in which a customer can select job configuration options and a price will be automatically and substantially instantaneously calculated and displayed. In one preferred embodiment, a customer is able to completely transact a printing job from a distant or remote location, using a variety of electronic file formats, and ultimately receive the order without ever having to leave his home or local place of business. Such a system provides enormous benefits to small and midsize customers that do not have established relationships with local printing service providers or to those customers that request their orders from remote or outlying areas where there are no local printing service providers. The present invention also allows previously created content to be used to directly generate full color printing.

The basic steps of one preferred embodiment of the present invention are shown in FIGS. 1A-1B. Specifically, a customer creates a digital graphic layout or image file in any electronic file format 20. Then the customer connects to the service provider's Web site 22. In one preferred embodiment, the customer downloads a Web page that includes a JAVASCRIPT™ pricing engine. The pricing engine has several spaces that allow a customer to select printing configurations (folding, coating, etc.) and, in some cases, enter information (quantity, identifying information, etc.) 24. As the customer selects each configuration option, the pricing engine automatically and substantially instantaneously calculates a price quote 26 and then automatically and substantially instantaneously displays the calculated price quote 28. The customer is able to change configuration options until he decides the configuration is final 30. The customer then forwards his job specifications, the digital graphic layout or image file, and his information to the printing service provider 32. The service provider prepares the digital graphic layout or image file for full color printing 34. The service provider then creates and submits a proof of the prepared file for the customer to approve 36, 38. If minor changes are needed, the service provider makes the requested changes 40 and prepares and resubmits the proof 34, 36, 38. On the other hand, if substantial changes are needed, the process may be ended 42. If, however, the proof is satisfactory, the customer approves the proof 39 and final preparations are made for print production 44. Finally, the printing service provider prints and delivers the finalized full color printing to the customer 46. These steps are explained in greater detail below.

As shown in FIGS. 1A-1B, a customer preferably first creates a graphic layout or image file in any electronic format 20, including but not limited to those of RGB-only graphic computer applications. Formats known to be compatible include MICROSOFT WORD™, MICROSOFT PUBLISHER™, ADOBE ACROBAT™, and PAGE MAKER™. A variety of other graphics programs will also be compatible with the invention.

Figure 8:
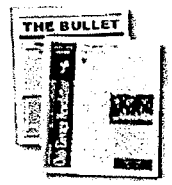

Next the customer connects to a printing service provider's Web site or other customer interface 22, usually from a remote terminal. In one preferred embodiment, the customer uses a standard home or office computer to electronically connect with the printing service provider through an Internet Web site or through e-mail. Companies that have LANS or WANS, however, could implement this invention over their network. Further, dedicated Internet machines or "WEB TV's" could be used in place of traditional computer terminals. If an Internet Web site is used, a home page, such as those shown in FIGS. 2 and 8, provides an initial point of contact. The home page may include several screens of information regarding the process as well as links to other aspects of the invention.

In one preferred embodiment of the present invention, the customer accesses or downloads a pricing engine in which he is able to automatically and substantially instantaneously receive a price quote based on selected or input configuration options 24, 26, 28. Preferably, this is an interactive process in which the customer selects configuration options 24, the pricing engine calculates the price quote instantaneously as the customer selects the configuration 26, and the price quote is displayed for the customer 28. These steps are accomplished almost instantaneously and preferably without having to query the service provider's server. For example, when the customer inputs the quantity and selects "calculate price" (FIGS. 4, 9A, and 10), the pricing engine or mechanism updates quotes on such items as the total printing price, price per piece, shipping price, and total print-job price. These steps may be repeated based on multiple sets of desired printing options. Only when a customer has determined that the configuration is final 30 does the customer continue with the process. In other words, if the quote is not satisfactory 30, the customer could change his configuration options and automatically receive a new price quote. On the other hand, if the price quote is satisfactory 30, the customer would continue with the process.

Figure 4:
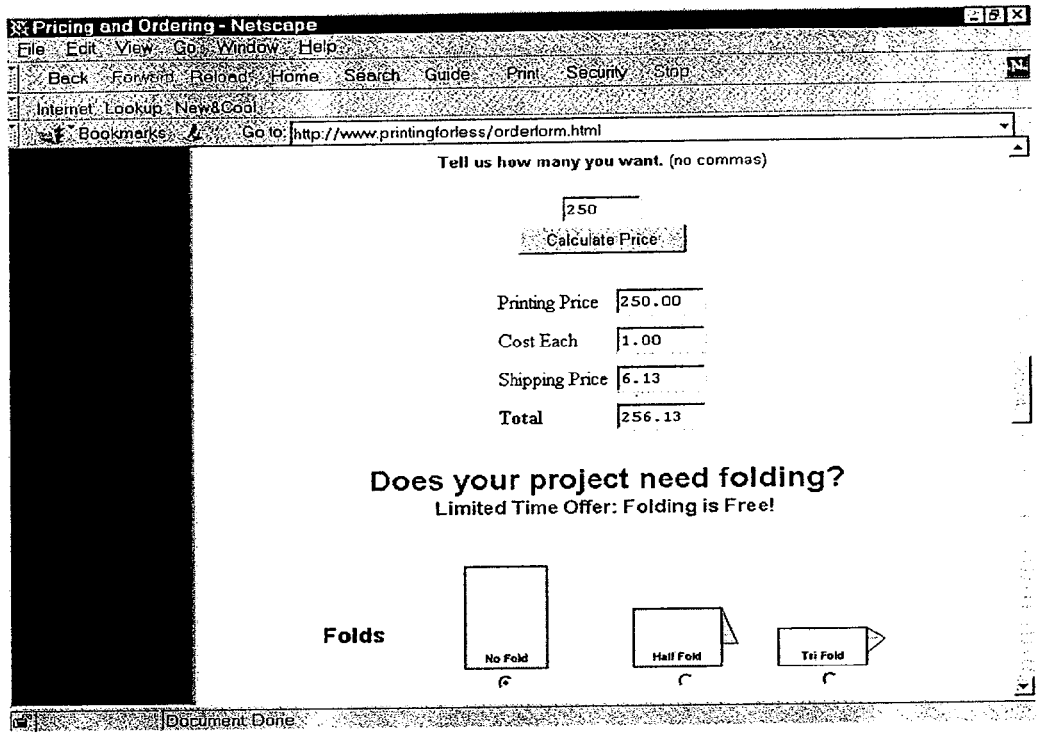
Figure 5:
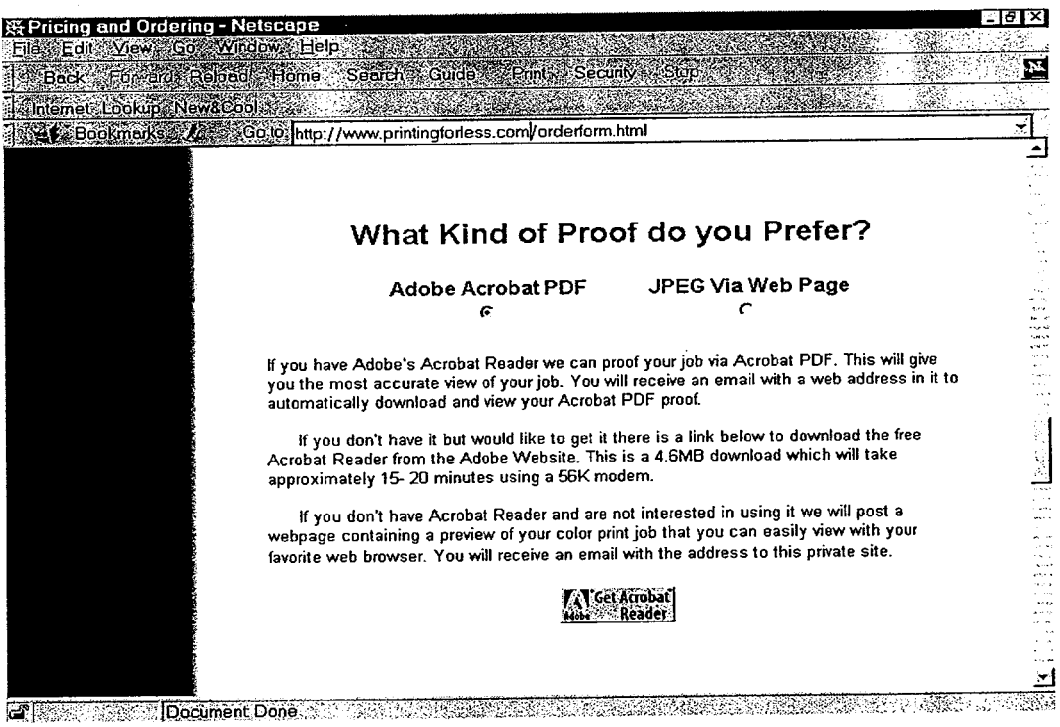
Figure 6:
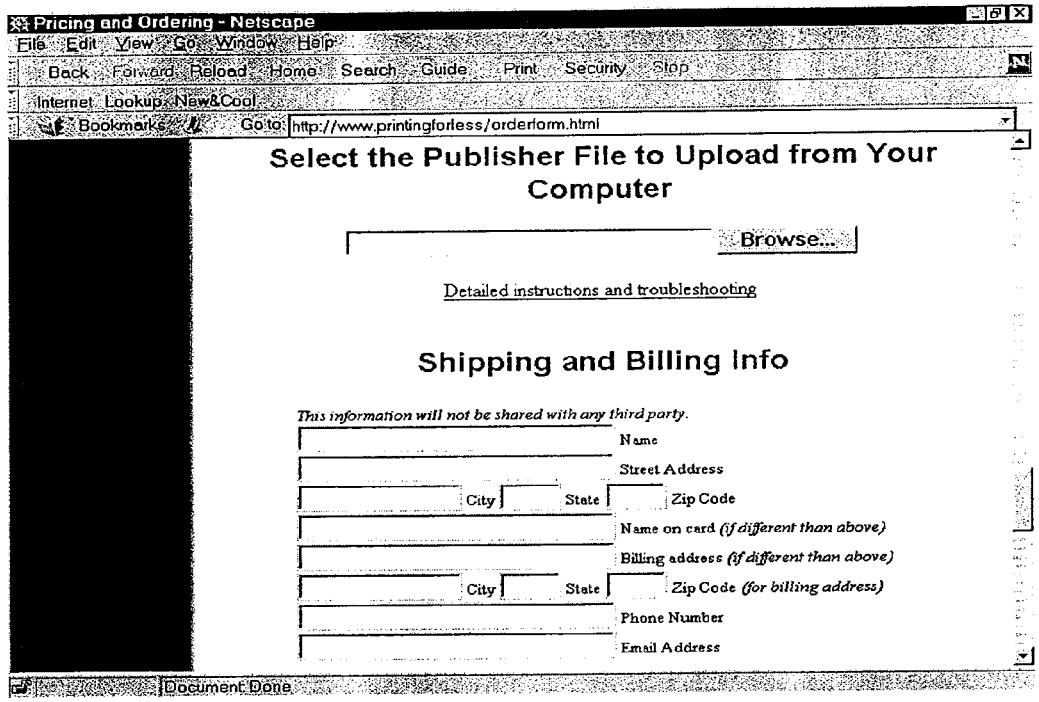
Figure 7:
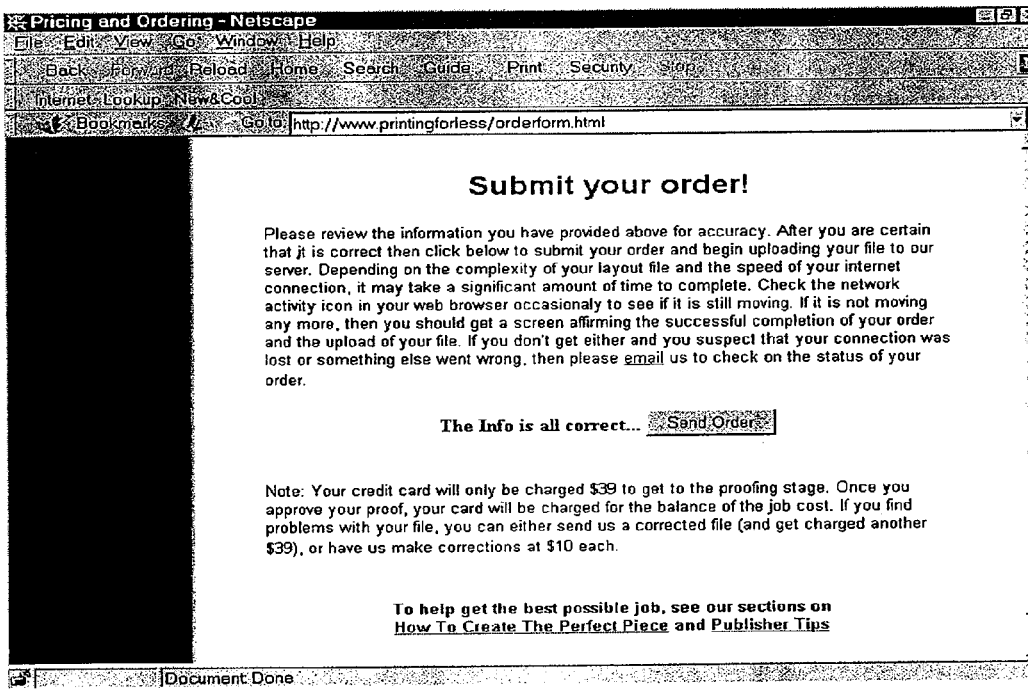

FIGS. 2-7 show one preferred system of allowing a customer to submit configuration options. FIGS. 8-10 show an alternate preferred system of allowing a customer to submit configuration options. Specifically, these figures show exemplary Internet Web-based print-order interfaces. In these embodiments, the entire order-taking mechanism is distilled onto one easy-to-understand, simply worded, moderate sized Web page. Preferably the options are graphic or icon-based. For example, as shown in FIG. 4, the customer may click on one of three types of folds that are shown graphically. FIG. 9A shows an alternate method of showing the graphic in which clicking on the appropriate word description changes the graphic to show the selected option. The print options may be limited to avoid information overload but are preferably flexible enough to allow a customer to produce the majority of the types of print projects. Some available options include but are not limited to sheet dimensions (FIGS. 3 and 8), printing on one side or both sides (FIGS. 3, 9A, and 10), color options (FIGS. 9A and 10), paper options (FIGS. 9A and 10), coating options (FIGS. 9A and 10), normal versus rush handling (FIG. 10), quantity desired (FIGS. 4, 9A, and 10), folding options (FIGS. 4 and 9A), proofing options (FIGS. 5 and 9A), and number of pages desired in a catalog (not shown). The customer may also input shipping information (FIGS. 6 and 9B), contact information (FIGS. 6 and 9B), and billing information (FIGS. 6 and 9B). Finally, the customer selects the project file (FIGS. 6 and 9B) residing on his hard disk (or submitted in an alternate format or as a previous order) that contains the electronic image or layout to be printed. The submitted information is preferably entered into a customer database via an encrypted, secure Web transaction.

The present invention may include the optional step (not shown) of requesting a scheduling quote. Like requesting the price quote, the customer could input desired options and request a quote. The service provider's CPU would then calculate the scheduling quote and transmit it to the customer. Like the price quote, one preferred embodiment of the invention would have an automatic and instantaneous scheduling quote.

Once the configuration is final, the next step is for the customer to submit the digital graphic layout or image file and the desired print options to the printing service provider 32. In one embodiment this is sent over the Internet. The customer can "browse" his own hard disk to find the project file containing the electronic image or layout. After the file is selected, the file upload mechanism waits until the customer selects "send order." Preferably, if the customer has neglected to fill in any required information, he immediately receives feedback to that effect and the processing process of his job is delayed. Because this is (preferably) a secure commerce server, all the information and data is encrypted during transport over the network. In addition to transmitting the information over an electronic communication medium such as an Internet Web site, e-mail, LAN, or WAN, traditional transmittal methods, including but not limited to ground-based mail service, and air-based mail service, could be used for transmitting data and/or the information.

Upon submission of the order, the customer's project file is uploaded to the printing service provider's server. The order information is written to a database on the server. The service provider is also notified of the new order, preferably by electronic communication such as e-mail.

The printing service provider then prepares the digital graphic layout or image file for full color printing 34. Depending on the file format of the digital graphic layout or image file (project file), the preparation may require the printing service provider to convert the project file into a format compatible with its full color printing system. This may mean that the project file will have to be manipulated before it can be used in full color printing. The high-end page layout programs have a process color separation module built into their print engines. Exemplary high-end page layout programs include but are not limited to ADOBE PHOTOSHOP™, QUARK XPRESS™, and PAGEMAKER™. Digital graphic layout or image files created in these programs will generally need little or no preparation for full color printing.

On the other hand, most common graphic computer applications used by nonprofessionals, including but not limited to MICROSOFT WORD™, ADOBE ACROBAT™, CORELDRAW!, and MICROSOFT PUBLISHER™, are RGB-only graphic computer applications. In one preferred embodiment of the present invention, the system creates full color printing from nonstandard format project files using off-the-shelf but little known technology. In one preferred embodiment ADOBE ACROBAT™, PITSTOP™, QUITE IMPOSING PLUS™, and QUITE A BOX OF TRICKS™ are used. This list of programs is meant to be exemplary and is not meant to limit the scope of the invention. The printing service provider may examine the project file and remedy anything that would hinder the successful production of the piece.

Once the project file has been properly prepared, the printing service provider creates a proof of the prepared file 36. The proof is preferably created in a format specified by the customer, including but not limited to an ADOBE ACROBAT™ PDF file or a Web-based JPEG file. The proof is then submitted to the customer for approval 38. The proof may be submitted over an electronic communication medium such as an Internet Web site, e-mail, LAN, or WAN. Alternatively, the proof may be submitted in electronic format (on a disk or other storage medium) or hard copy through traditional delivery, including but not limited to ground-based mail delivery or air based mail delivery.

If the customer selected electronic proofing over the Internet, in one preferred embodiment of the invention the proof is uploaded to a proofing server and an e-mail is sent to the customer along with his order number, encrypted password, and the URL (Web address) of the proof. This allows the customer to enter a restricted area on the server, view his proof, and check for any problems he may have missed or that may have been inadvertently introduced by the file upload mechanism.

Figure 11:
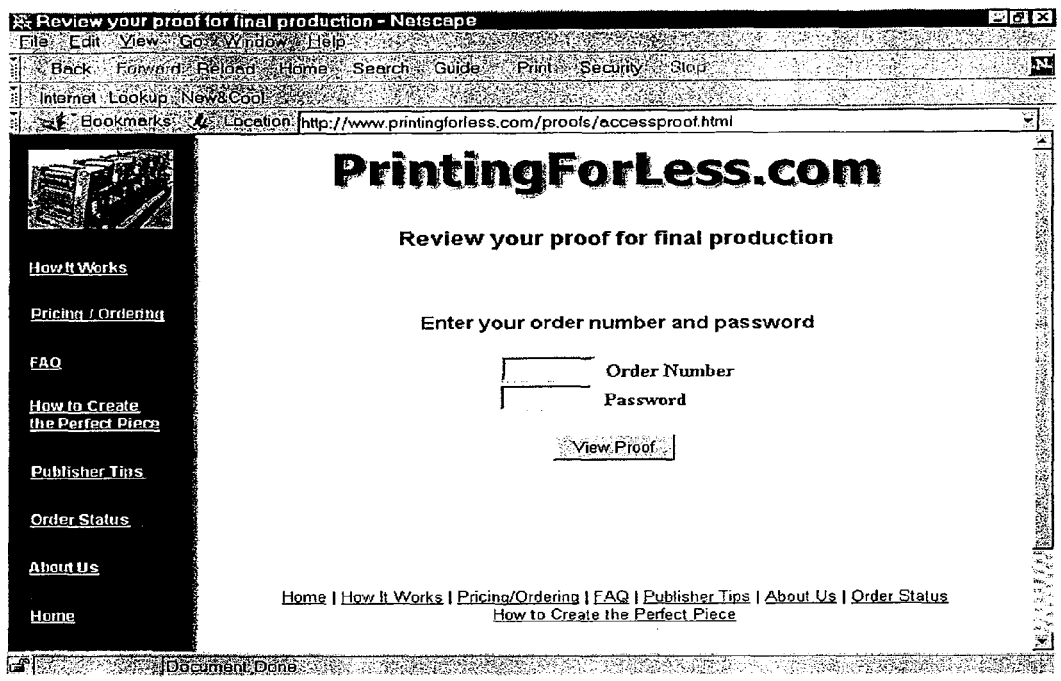
FIGS. 11-13 are exemplary embodiments of customer proofing interfaces.
Figure 12:
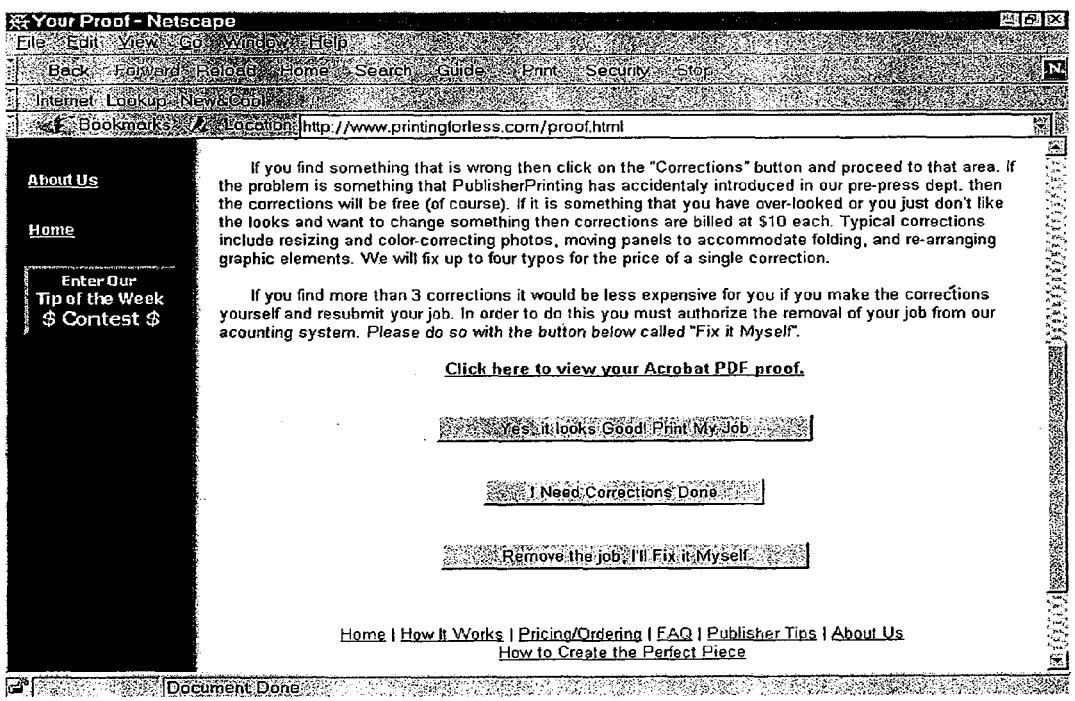
Figure 13:
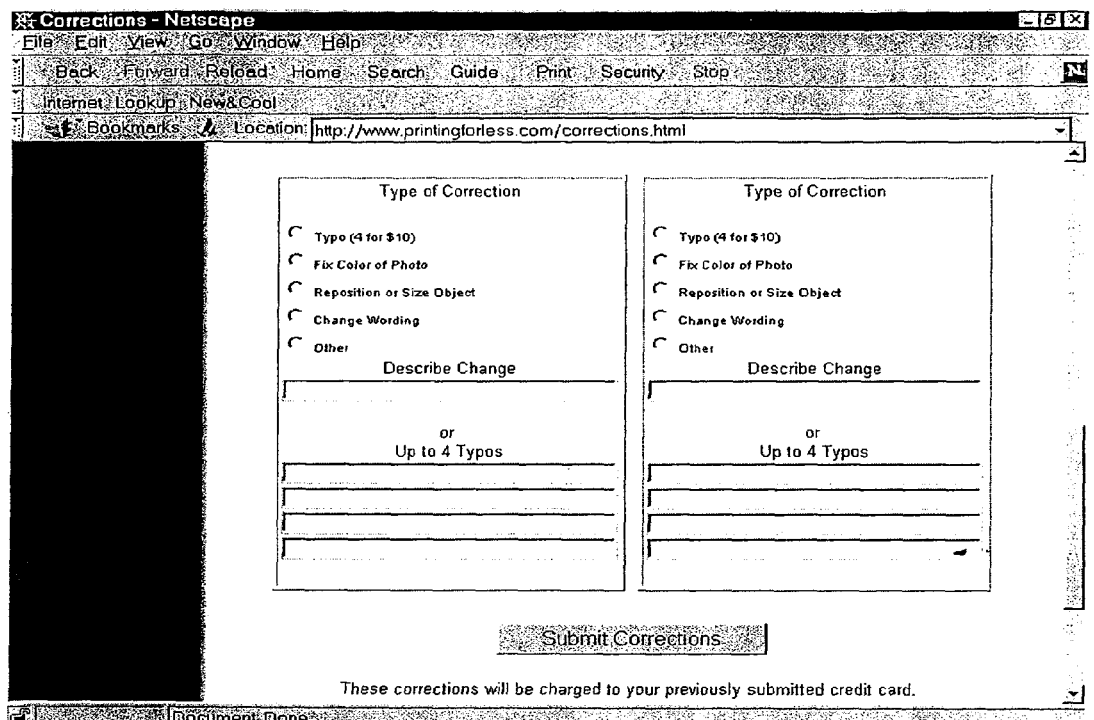

The customer is then asked to approve the proof 39. FIGS. 11 and 12 show one preferred method of allowing a customer to access, review, and approve the proof. If the proof is satisfactory, the customer communicates the approval to the printing service provider. FIG. 12 shows one preferred method of allowing a customer to communicate approval by selecting "print my job." This notifies the printing service provider automatically that the project file may be printed in its current form. But if the proof is not satisfactory, the printing service provider prepares and submits a new proof 34, 36, 38. FIG. 13 shows one preferred embodiment of a form in which the customer electronically submits corrections. The form may allow the user to define a number of corrections 40 or changes or abort the process and redo the file 42. If only minor changes are needed, they are automatically appended to the customer job database and the requested changes are made 40. The customer may also choose to fix the job himself and submit a new order with a new file 42 if substantial changes are necessary.

The customer may also be asked to authorize payment for the printing at this time. One preferred method for authorizing payment is for the customer to enter a credit card number directly into an Internet Web site or through e-mail. The customer may also authorize payment using other methods, including but not limited to communicating a credit card number over a phone or fax line, paying through a line of credit, paying by check, paying by cash, or paying via an electronic monetary exchange system, such as CYBERCASH™ or WEBCHECK™. Authorizing payment may be done at any point in this system. For example, the customer may be asked to authorize payment prior to the printing service provider's preparation and submittal of the proof and in one preferred embodiment of the invention, the customer is charged a flat fee for handling the file examination and proof-generation stage.

Upon the customer's approval of the proof, the printing service provider prints the finalized full color printing 44, 46. This preferably includes making imposed, color-separated film, which is used to make printing plates. In one preferred embodiment the file is first printed to ADOBE ACROBAT™ PDF format, using a special set of options that preserve the full resolution of all graphic elements and transfers all fonts used with it. This PDF is then imported into ADOBE'S ACROBAT™ Exchange program and checked for accuracy to the original layout. Upon satisfaction of the prepress technician, the file is imposed into printer spreads, using a plug-in program to EXCHANGE™ called QUITE IMPOSING™, by Quite Software, Ltd., Preps by ScenicSoft, or a similar program. This generates a new, imposed file, which is checked for accuracy. Then the separation stage begins. An add-on plug-in to EXCHANGE™ called CRACKERJACK™, by Lantana, may be used as a print engine for output to Prepress Solutions' PANTHERPLUS IMAGESETTER™. Other methods and software packages may be used to generate the high quality color-separated film that is then used for printing using traditional full color printing methods.

Finally, the printing service provider delivers the final printing job to the customer 46. This will typically be performed through a ground-based or air-based delivery system. An optional feature of the present invention is the availability of order status tracking. Order status tracking may be accessed by the customer from a link off the home page (FIGS. 2 and 8). The customer simply inputs an order reference number in order to receive the daily updated status of the production of his print job. During processing of the print job the order status may include such information as the production stage the job is in and the estimated shipping date. Upon completion and shipment of the print job, the order status tracking will indicate, for example, a UPS shipping number (if a ground-based delivery option was selected) and a convenient UPS shipment-tracking device.

FIG. 14 shows an exemplary embodiment of a job ticket. Typically, job tickets are used in the printing industry to carry all the information required to complete the job at each stage of production as it moves through the manufacturing facility. In most shops, this job ticket is either manually filled in by a production planner, or generated by shop-management software and used internally at the printing company. Tickets are generally of a "fill in the blank" nature, where the blanks include customer name and contact information, quantity, dimensions, paper size, etc. In the present invention, the job ticket is completed by the Web server based on the configuration or specification options selected by the customer on the Web page. In one preferred embodiment, the job ticket is a "dynamically generated HTML page," that can be printed.

The terms and expressions that have been employed in the foregoing specification are used as terms of description and not of limitation, without intending to exclude equivalents of the features shown and described or portions of them. The scope of the invention is defined and limited only by the claims that follow.

What is claimed is:

1. A computerized method having a processing computer for processing orders for full color printing, comprising:
    receiving from a customer a print order including a plurality of print configuration options, delivery options, and customer contact and billing information;
    receiving from the customer a digital file for full color printing according to the print order, wherein the customer's digital file is created using a computer and any RGB graphic computer application that creates or includes RGB-only images and does not include a color separation module;
    processing the digital file by computer by converting the digital file into a press-ready file with a type/format compatible for full color printing, the processing comprising:
        printing the digital file to a PDF file format that preserves the color characteristics from the digital file for any graphic elements in the digital file;
        imposing the accurate PDF file into printer spreads to create an imposed file;
        applying a color separation process to the imposed file to generate color separated plates; and
        printing from the color separated plates using traditional full color printing methods; and
    creating a proof of the processed digital file to be submitted to the customer for approval.

2. The method of claim 1, wherein the proof is created in a format specified by the customer.

3. The method of claim 1, further comprising submitting the digital file to a printing service provider for full color printing according to the print order.

4. The method of claim 3, wherein the customer provides the print order in real-time on a Web page associated with the printing service provider via a Web browser.

5. The method of claim 4, wherein the print configuration options include print dimension, color, paper and quantity options, and the delivery options include production speed and shipping information.

6. The method of claim 5, wherein the Web page includes a pricing engine, the pricing engine automatically calculating a price quote.

7. The method of claim 6, further comprising automatically and substantially instantaneously calculating a new price quote each time the customer changes one of the print configuration or delivery options, and displaying the new price quote to the customer before the change is submitted.

8. The method of claim 1, further comprising providing access to the proof over an electronic communication medium.

9. The method of claim 1, further comprising obtaining payment from the customer.

10. The method of claim 1, further comprising printing the press-ready file and delivering printed material to the customer.

11. A computerized method having a processing computer for processing orders for full color printing, comprising:
    receiving from a customer a print order including a plurality of print configuration options, delivery options, and customer contact and billing information, wherein the customer provides the print order in real-time on a Web page associated with a printing service provider via a Web browser, the Web page including a pricing engine that automatically and substantially instantaneously calculates a new price quote each time the customer changes one of the print configuration or delivery options, and displays the new price quote to the customer before the change is submitted;
    receiving from the customer a digital file of any file type/format for full color printing according to the print order, wherein the customer's digital file can be of any type/format including a standard or non-standard type/format, where the digital file is created using a computer application that creates or includes RGB-only images and does not include a color separation module;
    processing the digital file by computer by converting the digital file into a press-ready file with a type/format compatible for full color printing, the processing comprising:
        printing the digital file to a PDF file format that preserves the color characteristics of any graphic elements in the digital file;
        imposing the PDF file into printer spreads to create an imposed file;
        applying a color separation process to the imposed file to generate color separated plates; and
        printing from the color separated plates using traditional full color printing methods; and
    creating a proof of the processed digital file to be submitted to the customer for approval.

12. The method of claim 11, wherein the proof is created in a format specified by the customer.

13. The method of claim 11, further comprising submitting the digital file to a printing service provider for full color printing according to the print order.

14. The method of claim 11, wherein the print configuration options include print dimension, color, paper and quantity options, and the delivery options include production speed and shipping information.

15. The method of claim 11, further comprising providing access to the proof over an electronic communication medium.

16. The method of claim 11, further comprising obtaining payment from the customer.

17. The method of claim 11, further comprising printing the press-ready file and delivering printed material to the customer.

18. A computerized method having a processing computer for processing orders for full color printing, comprising:

receiving from the customer a digital file of any file type/format for full color printing according to the print order, wherein the customer's digital file can be of any type/format including a standard or non-standard type/format, and wherein the digital file is created using a computer application that creates or includes RBG-only images and does not include a color separation module;

processing the digital file by computer by converting the digital file into a press-ready file with a type/format compatible for full color printing, the processing comprising:

printing the digital file to a PDF file format that preserves the color characteristics of any graphic elements in the digital file;

imposing the PDF file into printer spreads to create an imposed file;

applying a color separation process to the imposed file to generate color separated plates; and printing from the color separated plates using traditional full color printing methods.

\* \* \* \* \*